United States Patent [19]

Ugajin

[11] Patent Number: 5,652,892
[45] Date of Patent: Jul. 29, 1997

[54] METHOD AND APPARATUS FOR CONTROLLING REMOTE POWER SOURCE

[75] Inventor: Atsushi Ugajin, Sagamihara, Japan

[73] Assignee: Hitachi, Ltd., Tokyo, Japan

[21] Appl. No.: 323,886

[22] Filed: Oct. 17, 1994

[30] Foreign Application Priority Data

Oct. 20, 1993 [JP] Japan .................. 5-262216

[51] Int. Cl.$^6$ .................................................. G06F 13/00
[52] U.S. Cl. .................................................. 395/750
[58] Field of Search ........................... 395/325, 750; 355/200, 206; 340/825, 37; 364/707

[56] References Cited

U.S. PATENT DOCUMENTS

| | | | |
|---|---|---|---|
| 4,941,089 | 7/1990 | Fischer et al. | 395/325 |
| 5,191,323 | 3/1993 | Abbes et al. | 340/825.37 |
| 5,276,863 | 1/1994 | Heider | 395/575 |
| 5,293,196 | 3/1994 | Kaneko et al. | 355/200 |
| 5,313,580 | 5/1994 | Remion | 395/200 |
| 5,347,304 | 9/1994 | Moura et al. | 348/12 |
| 5,396,636 | 3/1995 | Gallagher et al. | 395/750 |
| 5,420,667 | 5/1995 | Kaneko et al. | 355/206 |

*Primary Examiner*—Gopal C. Ray
*Assistant Examiner*—John Travis
*Attorney, Agent, or Firm*—Antonelli, Terry, Stout & Kraus, LLP

[57] ABSTRACT

Remote power source control for a system having a plurality of information processing apparatuses interconnected by a network or networks capable of controlling remote power sources irrespective of different types of networks and providing security checks. Each information processing apparatus is provided with a remote power source controller which is always operated by an auxiliary power source. In instructing a power control of a remote information processing apparatus, control data is transferred between the remote information processing apparatus and a local information processing apparatus. The remote information processing apparatus checks a user ID and a password transmitted from the local processing apparatus prior to controlling its main power source.

13 Claims, 10 Drawing Sheets

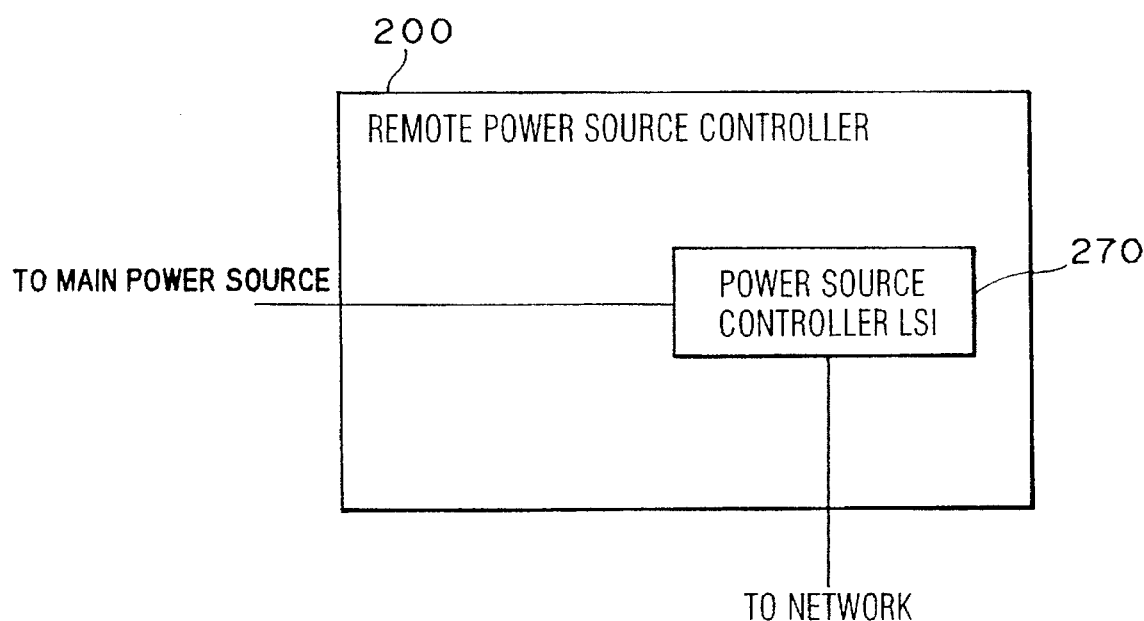

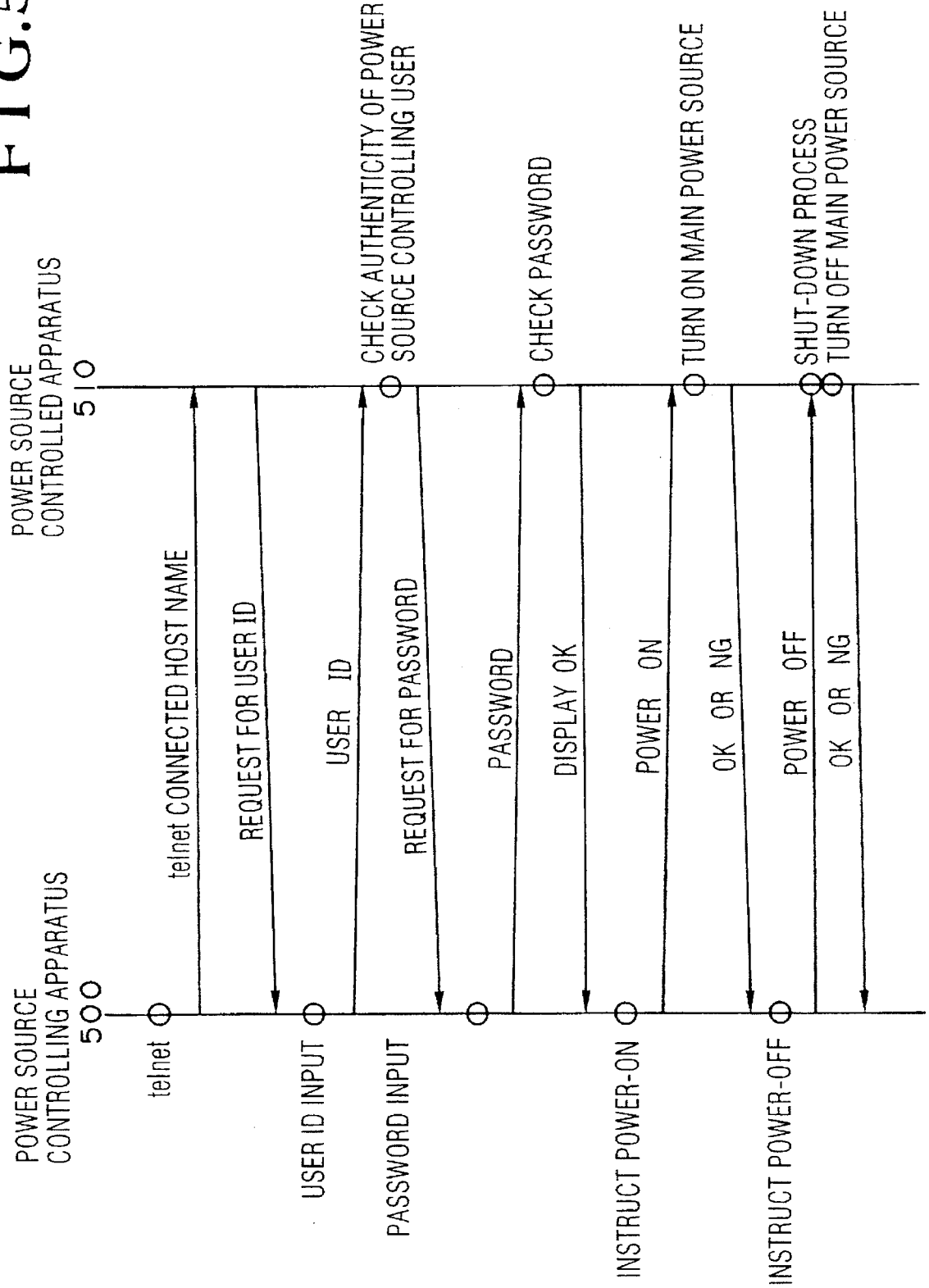

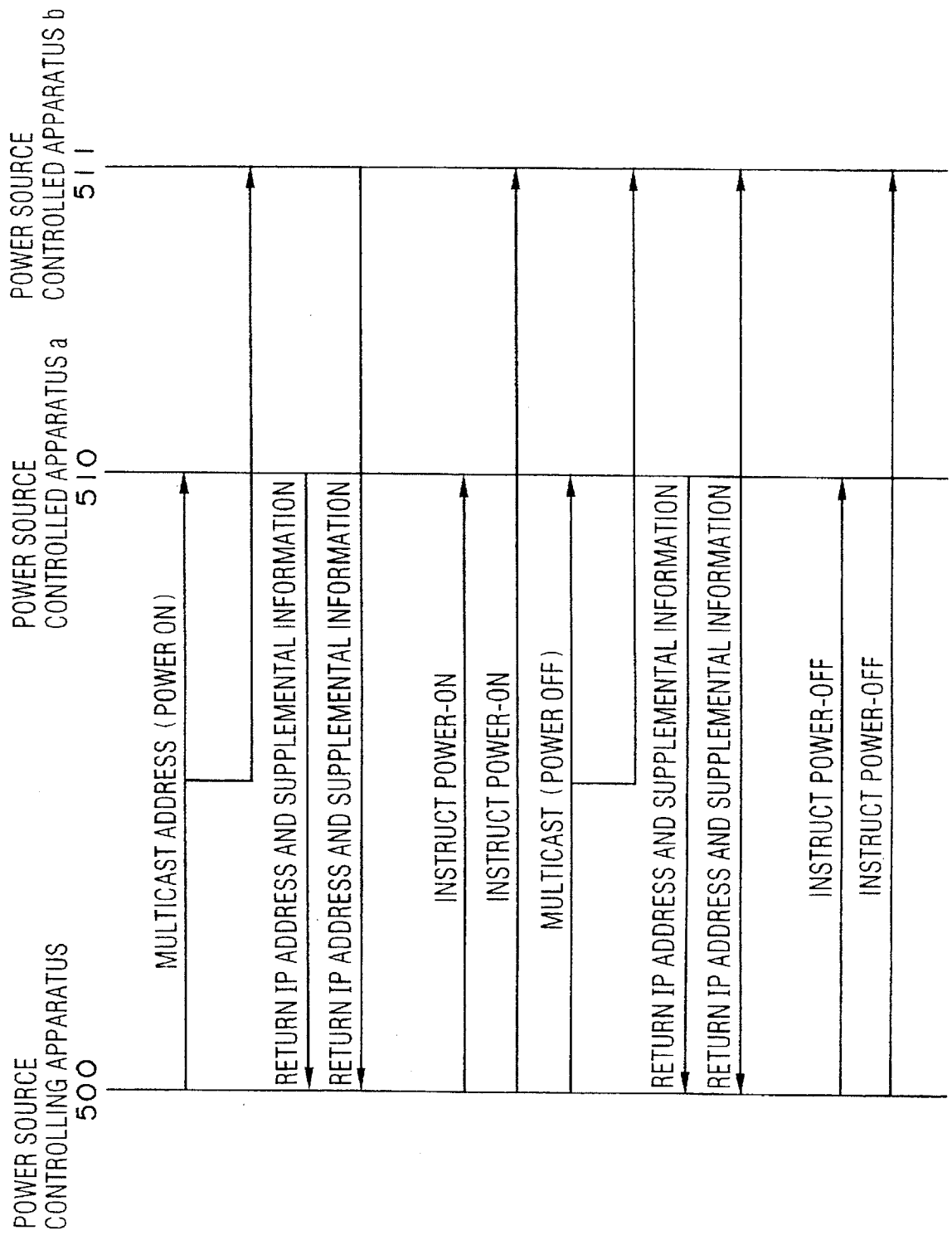

| DESTINATION IP ADDRESS | GATEWAY | No. OF TANDEM CONNECTED NETWORKS | INTERFACE |
|---|---|---|---|
|  |  |  |  |
| ⋮ | ⋮ | ⋮ | ⋮ |
|  |  |  |  |

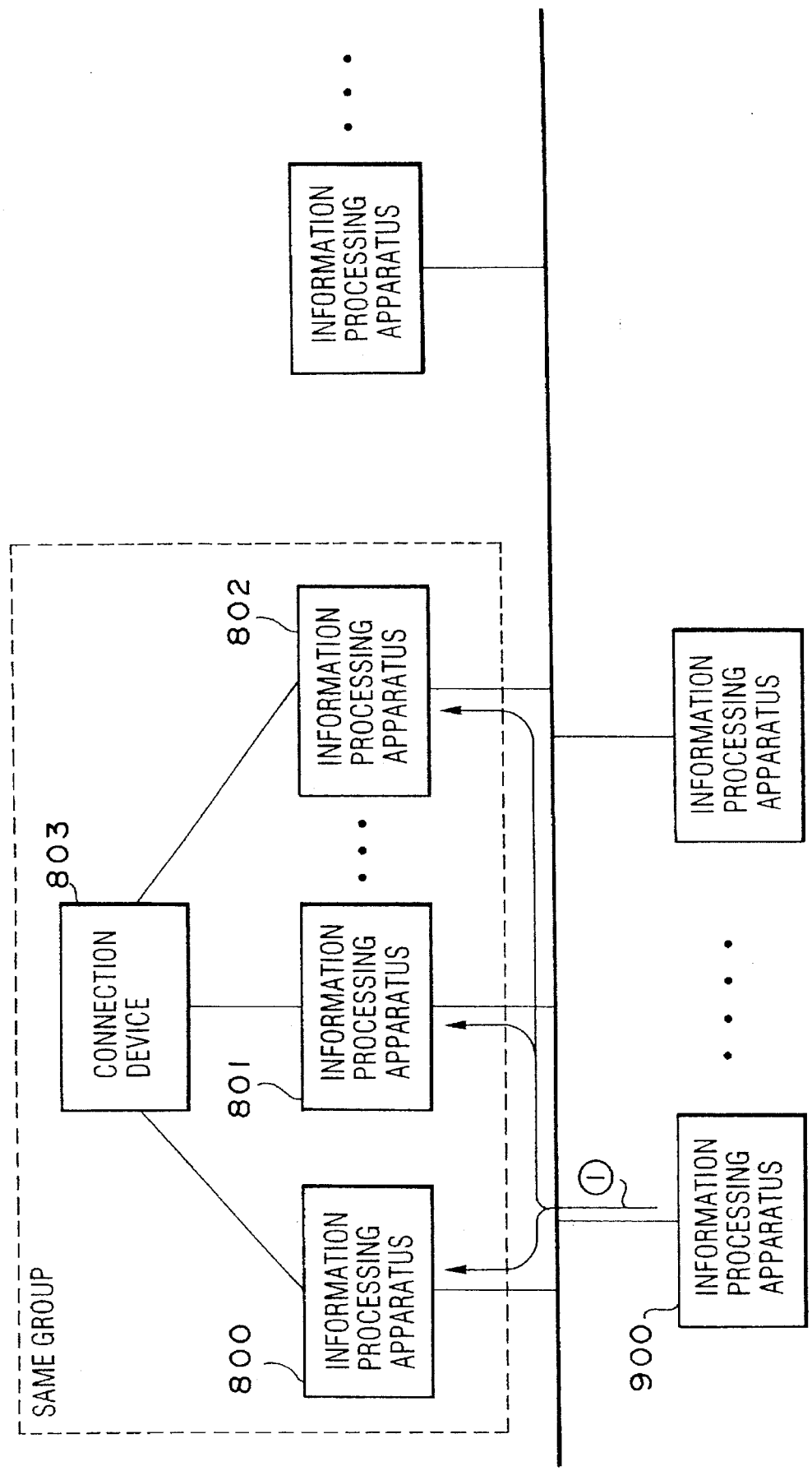

METHOD AND APPARATUS FOR CONTROLLING REMOTE POWER SOURCE

BACKGROUND OF THE INVENTION

1. Field of the Invention

The present invention relates to a remote power source control, and more particularly to a method and apparatus for turning on and off remote power sources of a plurality of information processing apparatuses connected to a network or networks by using remote power source controllers operated by auxiliary power sources of the information processing apparatuses.

2. Description of the Related Art

Distributed processing systems having a plurality of computers connected by a network are widely used. In such a distributed processing system, a host has a function of managing and operating remote computers. One example of such a function of a host is to perform a power source control for remote computers.

As the technology concerning remote power source controls, there are known a centralized power-off scheme in which a server machine transmits a special command to a client machine to turn off the power source of the client machine, reference being made to JP-A-4-284520, a power source stop controlling means in which upon reception of a command inputted from an operation terminal, a machine checks its operation state and if the state is a command accepting state, the power source is turned off, reference being made to JP-A-4-289906, and a terminal equipment in which when a power source control signal is detected from packet data received from a communication line, the terminal equipment controls a power source control unit to turn on or off its power source, reference being made to JP-A-4-343115.

The above-described prior art, however, has have the following problems. The prior art of JP-A-4-284520 pertains only to a power-off control of a client machine by a server machine, and does not consider how security is protected.

Similar to the first prior art, the prior art of JP-A-4-289906 pertains only to a power-off control and requires a command input from an operation terminal. The prior art of JP-A-4-343115 is applicable only to a power control of a terminal equipment. Since this prior art uses a type field of an EtherNet frame, a specific control method is required to be used, and in addition, machines from different vendors are difficult to interconnect. Furthermore, if power is being supplied to a terminal equipment, the power source is turned off, whereas if power is not being supplied to the terminal equipment, the power source is turned on. It is therefore necessary to provide the power source control unit with a logic circuit for operation state judgement. Still further, since a method of supplying power to an EtherNet controller is unspecified, there may be some problem about a power-on control. In addition, security means is not taken into consideration.

SUMMARY OF THE INVENTION

It is an object of the present invention to provide a remote power source control method and apparatus capable of controlling remote power sources independently of network architectures and types and providing security checks.

According to one aspect of the present invention achieving the above object, there is provided a remote power source control apparatus for a system having a plurality of network interconnected information processing apparatuses, wherein each of the plurality of information processing apparatuses includes a main power source, an auxiliary power source, and a remote power source controller always operated by the auxiliary power source, and the remote power source controller includes means for transmitting and receiving data between networks and means for controlling a power-on or power-off of the main power source of the information processing apparatus receiving the data in accordance with the received data.

According to a second aspect of the invention, the remote power source controller includes means for checking whether the data has been transmitted from an authorized user.

According to a third aspect of the invention, a first information processing apparatus constitutes a power source controlling apparatus and second to n-th (n is a positive integer) information processing apparatuses constitute power source controlled apparatuses, wherein the remote power source controller of the first information processing apparatus includes means for storing a control program predefining a power-on or power-off order of main power sources of the second to n-th information processing apparatuses, if there is any restriction on the power-on or power-off order.

According to a fourth aspect of the invention, the plurality of information processing apparatuses constitute a server or servers and clients, the server controls the main power source of the client, or the client controls the main power source of the server, or a first server controls the main power source of a second server, or a first client controls the main power source of a second client.

According to a fifth aspect of the invention, the plurality of information processing apparatuses constitute a multiprocessor system interconnected to other information processing apparatuses via a network or networks, one of the other information processing apparatuses controls the main power source of a first information processing apparatus of the multiprocessor system, and the first information processing apparatus controls the main power sources of the remaining information processing apparatuses of the multiprocessor system.

A plurality of information processing apparatuses are interconnected by a network or networks, and the remote power source controller of each information processing apparatus is always powered by an auxiliary power source. When an information processing apparatus A operating as a power source controlling apparatus instructs via a network an information processing apparatus B operating as a power source controlled apparatus to turn on or off the main power source of the information processing apparatus B, the information processing apparatus A transmits power control instruction data. The information processing apparatus B checks a user ID and a password transmitted from the information processing apparatus A, and thereafter turns on the main power source thereof. The remote power source control method of the invention is applicable to various types of networks such as a client/server model and tandem connected networks.

The other objects, features, and advantages of the invention will become apparent from the following description taken in conjunction with the accompanying drawings.

BRIEF DESCRIPTION OF THE DRAWINGS

FIG. 3 is a schematic diagram of the remote power source controller realized by using an LSI chip.

FIG. 4 is a table for designating a power-on order.

FIG. 5 shows a power source control sequence using the Telnet protocol according to an embodiment of the invention.

FIG. 6 shows a power control sequence using an IP multicast address according to another embodiment of the invention.

FIG. 15 is a diagram showing a cluster system configuration in which the main power sources of information processing apparatuses belonging to a same group are controlled collectively by using an IP multicast address.

DESCRIPTION OF THE PREFERRED EMBODIMENTS

Figure 1:
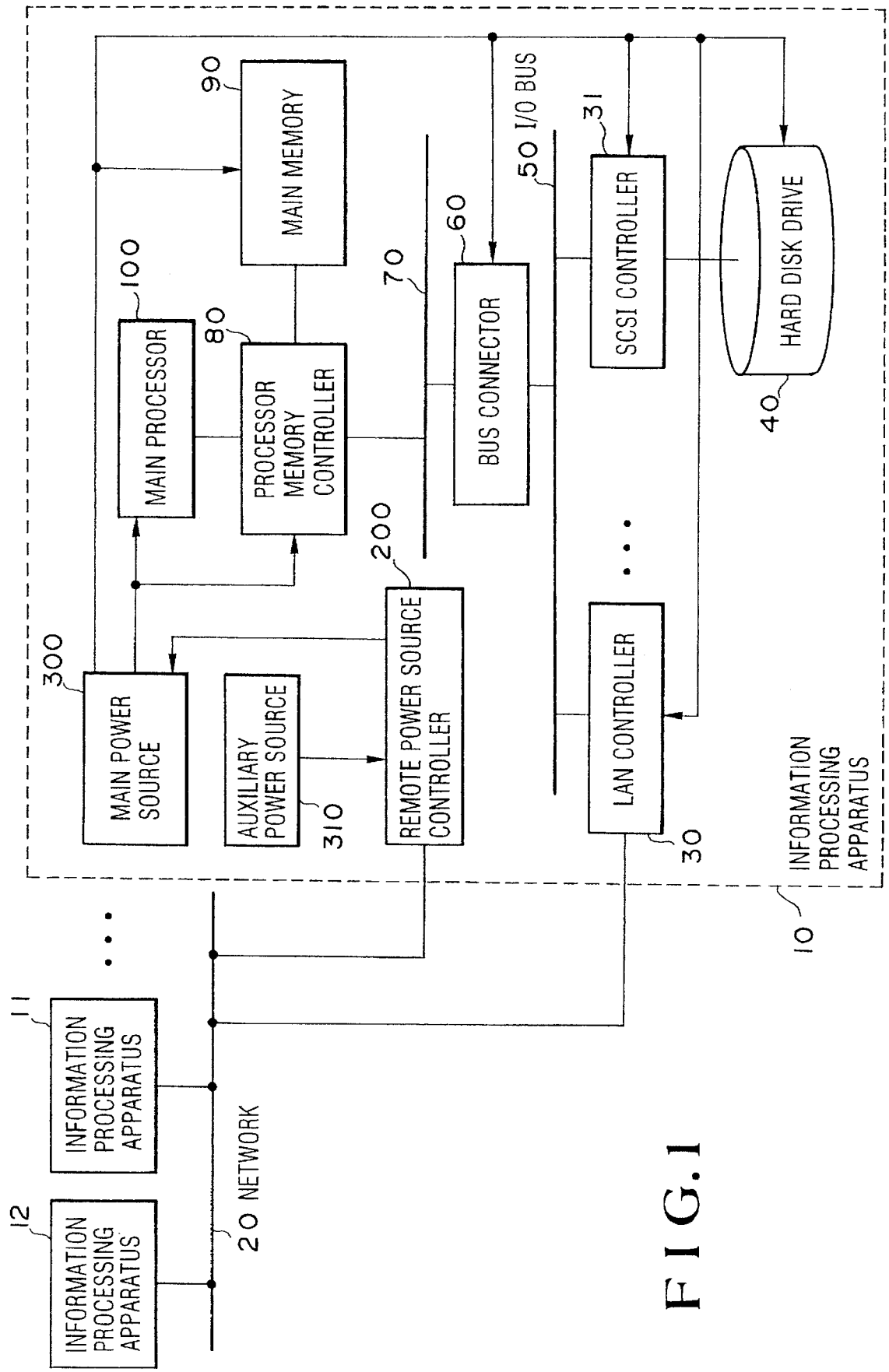
FIG. 1 shows a system configuration according to an embodiment of the invention.

Embodiments of the invention will be described with reference to the accompanying drawings. FIG. 1 shows a system configuration according to an embodiment of the invention. Referring to FIG. 1, information processing apparatuses 10, 11, 12 are connected to a network 20 such as a LAN. The information processing apparatus 10 has a main power source 300 and an auxiliary power source 310 which supply power to the information processing apparatus 10.

The auxiliary power source 310 always and continuously supplies power to a remote power source controller 200, and as shown in FIG. 1, supplies power to only the remote power source controller 200. The main power source 300 supplies power to all devices of the information processing apparatus 10 not supplied with power by the auxiliary power source 310. That is, as shown in FIG. 1, the main power source 300 supplies power to all of the devices of the information processing apparatus 10 except the auxiliary power source 310 and the remote power source controller 200. The main power source 300 can be turned on in response to a power-on signal from the remote power source controller 200, or may be turned on in response to a depression of a panel switch.

Each element or device in the information processing apparatus 10 will be explained. A main processor 100 is a dominant element of the information processing apparatus 10. A processor memory controller 80 controls an access from the main processor 100 to a main memory 90 and accesses from a LAN controller 30 and a SCSI (small computer system interface) controller 31 to the main memory 90.

The LAN controller 30 and SCSI controller 31 are connected to an I/O bus 50 which is connected via a bus connector 60 to a system bus 70. The system bus 70 is used for accessing the main memory 90 via the processor memory controller 80. The LAN controller 30 controls an access to the network 20, and the SCSI controller 31 controls an access to, for example, a hard disk drive 40.

Figure 2:
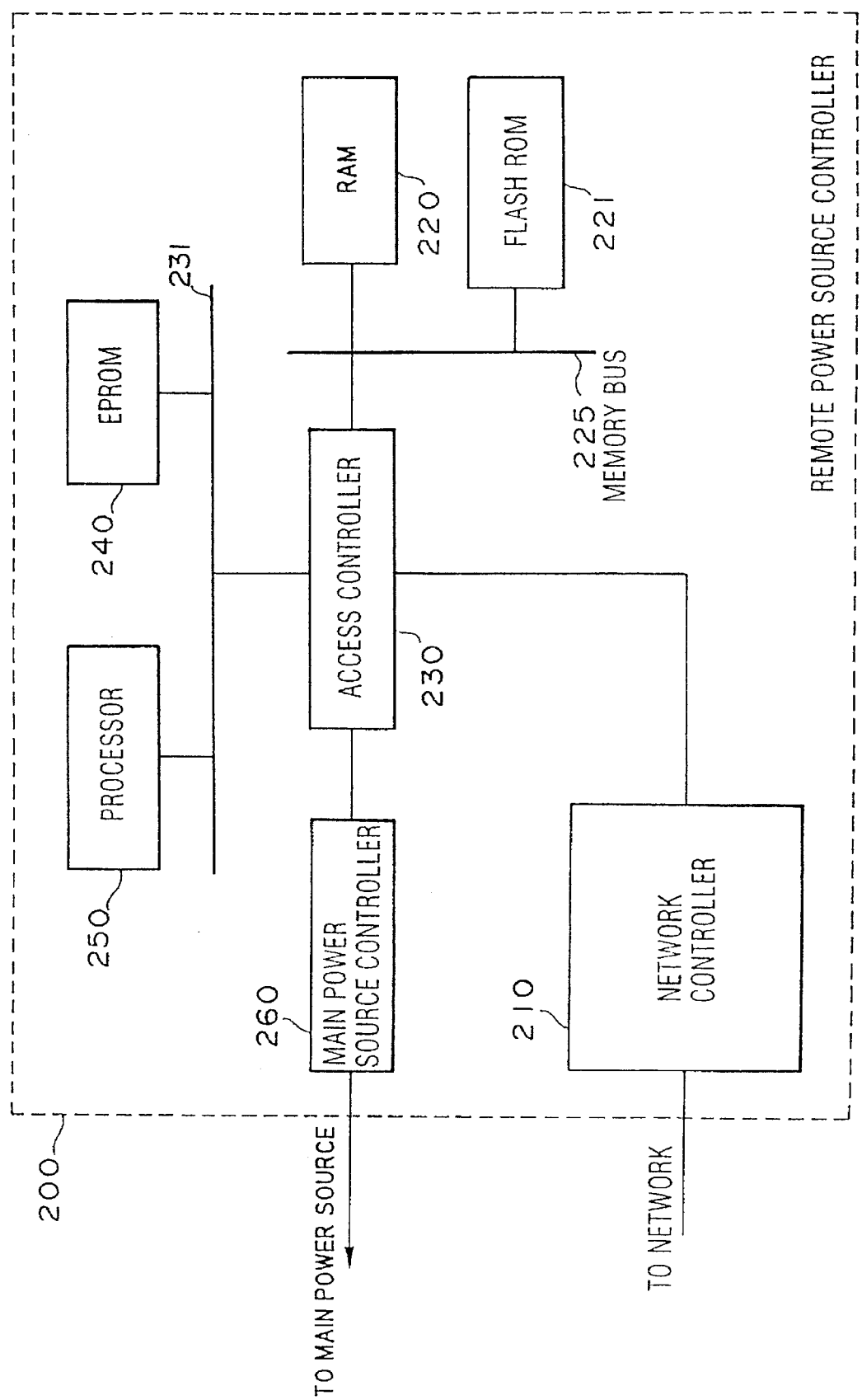
FIG. 2 is a block diagram showing the structure of a remote power source controller.

FIG. 2 is a block diagram showing the structure of the remote power source controller 200. Referring to FIG. 2, a network controller 210 controls an access to the network 20. Data received from the network 20 is stored in a RAM 220, and data is transmitted from the RAM 220 to the network 20. A processor 250 instructs the network controller 210 to receive and transmit data. In response to this instruction, the network controller 210 performs a data reception or transmission operation. An access controller 230 controls an access to the RAM 220 and a flash ROM 221 from the processor 250, and an access to the RAM 220 from the network controller 210.

The RAM 220 and the flash ROM 221 are connected via a memory bus 225 to the access controller 230, and the processor 250 and an EPROM 240 are connected via a processor bus 231 to the access controller 230. All programs which run on the processor 250 are stored in EPROM 240. The flash ROM 221 stores IP (Internet Protocol) addresses conforming with RFC (Requests For Comments), MAC (Media Access Control) addresses conforming with IEEE, and other data.

A main power source controller 260 is connected to the access controller 230 and accessed by the processor 250. The main power source controller 260 controls a power-on and a power-off of the main power source 310.

FIG. 3 is a schematic diagram of the remote power source controller 200 realized by using a one-chip power source controller LSI 270 made of gate arrays.

FIG. 4 is a table 400 for designating a power source turn-on order. This power source turn-on order table 400 is stored in the flash ROM 221. For example, assuming that the information processing apparatus 12 shown in FIG. 1 instructs other information processing apparatuses to turn on their main power sources, that the information processing apparatuses 11 and 10 are instructed to turn on their power sources in this order, the power source turn-on order table 400 of the information processing apparatus 12 has the IP addresses of the information processing apparatuses 11 and 10 stored in the address fields 400a and 400b, respectively. The end address field 400n stores an identifier representing the end of the table. Referring to the table 400, the information processing apparatus 12 turns on first the main power source of the information processing apparatus 11, and then the main power source of the information processing apparatus 10. If there is any restriction on a power source turn-off order, a similar power source turn-off table is prepared.

FIG. 5 shows a power source control sequence using the Telnet protocol according to an embodiment of the invention. When a power source controlling apparatus 500 instructs a power source controlled apparatus 510 to turn on or off its power source, a telnet command conforming with the RFC is used (the Telnet protocol runs on TCP/IP (Transmission Control Protocol/Internet Protocol) conforming with the RFC).

The power source controlled apparatus 510 is, for example, the information processing apparatus 10 shown in FIGS. 1 and 2, and the power source controlling apparatus 500 is, for example, the information processing apparatus 12 shown in FIG. 1. A telnet command sent from the power source controlling apparatus 500 to the power source controlled apparatus 510 is received by the network controller 210 and stored in the RAM 220. The processor 250 at the power source controlled apparatus 510 analyzes the data stored in the RAM 220 and requests the user ID of the power source controlling apparatus 500.

The power source controlling apparatus 500 then transmits the user ID. Upon reception of this user ID transmitted from the power source controlling apparatus 500, the power source controlled apparatus 510 checks the user ID by referring to a table (hereinafter called a user table) stored in the flash ROM 221. This user table stores data indicating whether each power source controlling apparatus has been authorized to perform a power source control. If the power source controlling apparatus 500 has been authorized, the power source controlled apparatus 510 requests the password of the power source controlling apparatus 500, whereas if the apparatus 500 has not been authorized, an error message is transmitted back to the power source controlling apparatus 500.

The authorized power source controlling apparatus 500 transmits the password. Upon reception of this password, the power source controlled apparatus 510 checks the password in the manner similar to checking the user ID. If the password is correct, then the control enters the Telnet mode, whereas if not correct, an error message is transmitted back to the power source controlling apparatus 500.

In response to a power-on command or a power-off command transmitted from the power source controlling apparatus 500 to the power source controlled apparatus 510, the power source controlled apparatus 510 performs a power-on or power-off operation.

FIG. 6 shows a power control sequence using an IP multicast address according to another embodiment of the invention.

Each of the main power sources of a plurality of power source controlled apparatuses a 510 and b 511 may be controlled by a power source controlling apparatus 500 using the Telnet protocol in the manner described in FIG. 5. However, in this embodiment, an IP multicast address is used to perform the power control of only those power source controlled apparatuses belonging to one group represented by the multicast address.

The power control may be performed by using broadcast addresses. With this method, however, the power control instruction is supplied to all the apparatuses connected to the network, including the apparatuses not intended to be power controlled. This can be avoided by using an IP multicast address.

In the sequence shown in FIG. 6, the power source controlling apparatus 500 transmits a multicast address to the power source controlled apparatuses a 510 and b 511, which send back their IP addresses and supplemental information to the power source controlling apparatus 500. This supplemental information includes information on whether the power source is turned on or off. In this manner, even if there is a power source controlled apparatus which does not want to perform the power control, the power source controlling apparatus can check the status of its power source.

Figures 7, 8:
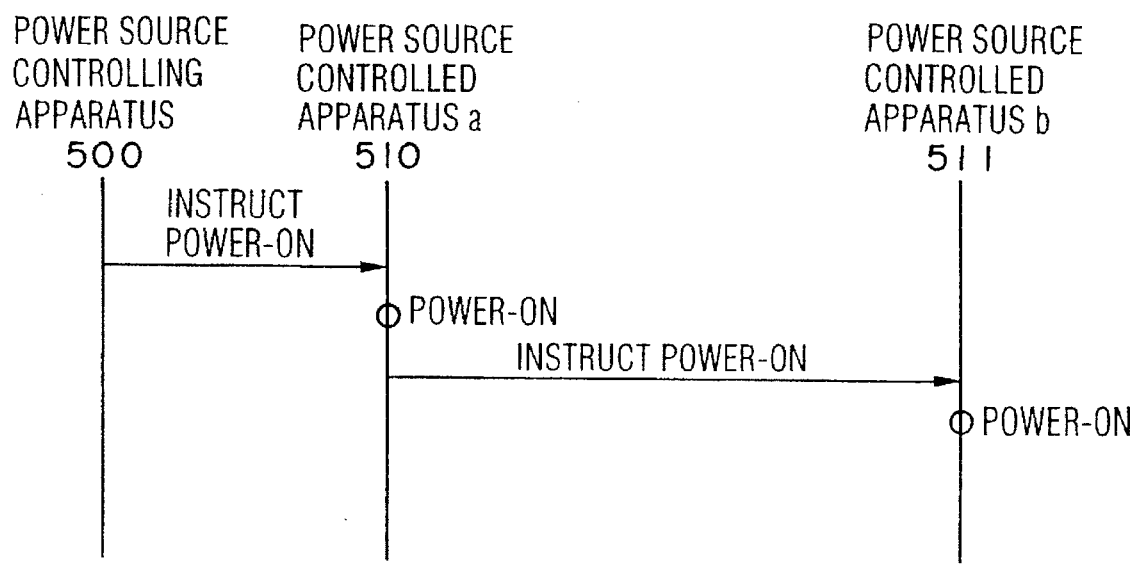
FIG. 7 shows a power control sequence used for tandem connected networks.
FIG. 8 shows the contents of a routing table used for tandem connected networks.

FIG. 7 shows a power control sequence used for tandem connected networks. FIG. 8 shows an example of a routing table for tandem connected networks. If a plurality of networks are tandem connected by gateways, it is necessary to use not only the IP address of a power source controlled apparatus a 510 but also the IP address of another power source controlled apparatus belonging to a network remoter than the network of the power source controlled apparatus a 510.

The routing table shown in FIG. 8 includes destination IP addresses, gateways, the number of tandem connected networks, and interfaces, and is stored in the flash ROM 221 of the power source controlled apparatus a 510. By using this table, it becomes possible to identify the IP address of a power source controlled apparatus of a network remoter than the network of the power source controlled apparatus a 510.

The power source controlling apparatus 500 first instructs the power source controlled apparatus a 510 to turn on its main power source. After the power-on of the power source controlled apparatus a 510, the IP address of a power source controlled apparatus of a network remoter than that of the power source controlled apparatus a 510 is passed via the RAM 220 shown in FIG. 2 to the program running on the main processor 100 shown in FIG. 1 of the power source controlled apparatus a 510. The program receiving the IP address operates in accordance with the power control sequence shown in FIG. 5 or 6 to turn on or off a power source controlled apparatus b 511 or another power source controlled apparatus.

Figure 9:
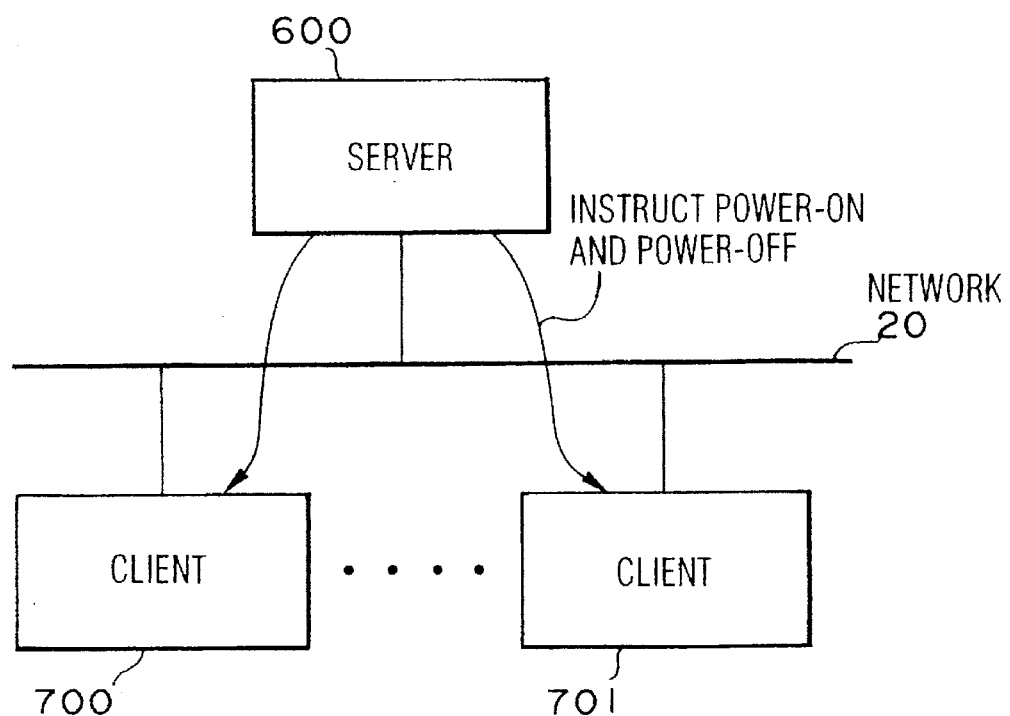
FIG. 9 is a diagram showing a network in which a server controls the main power source of a client.

FIG. 9 is a diagram showing a network in which a server controls the main power source of a client. A server 600 corresponds to a power source controlling apparatus, and clients 700 and 701 correspond to power source controlled apparatuses. Power is turned on or off in accordance with the power control sequence shown in FIG. 5 or 6.

Figure 10:
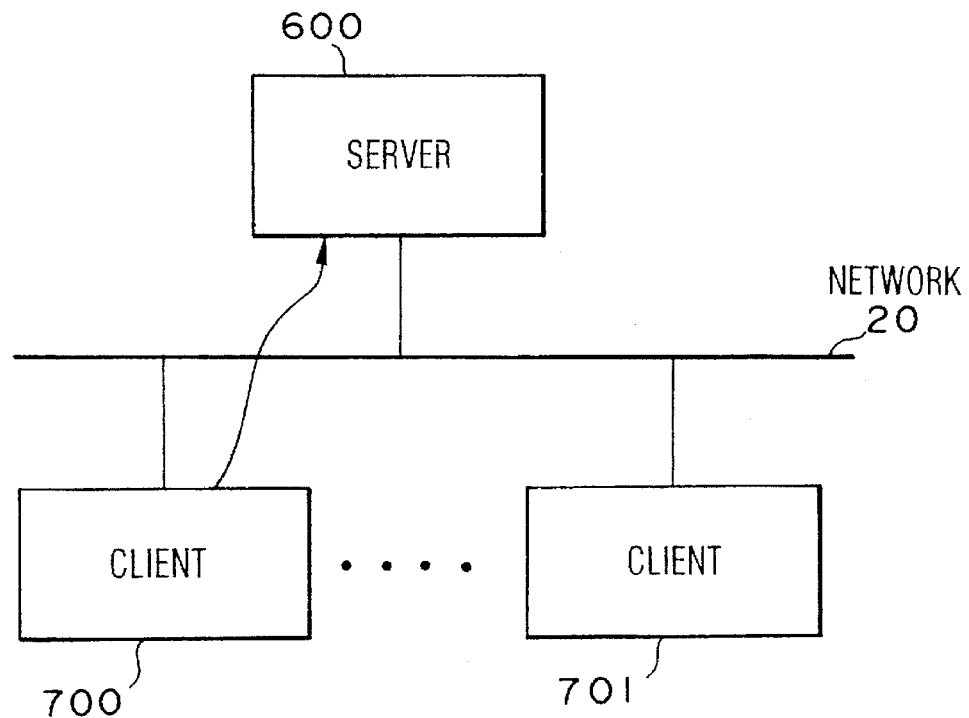
FIG. 10 is a diagram showing a network in which a client controls the main power source of a server.

FIG. 10 is a diagram showing a network in which a client controls the main power source of a server. A client 700 corresponds to a power source controlling apparatus and a server 600 corresponds to a power source controlled apparatus. Power is turned on or off in accordance with the power control sequence shown in FIG. 5 or 6.

Figure 11:
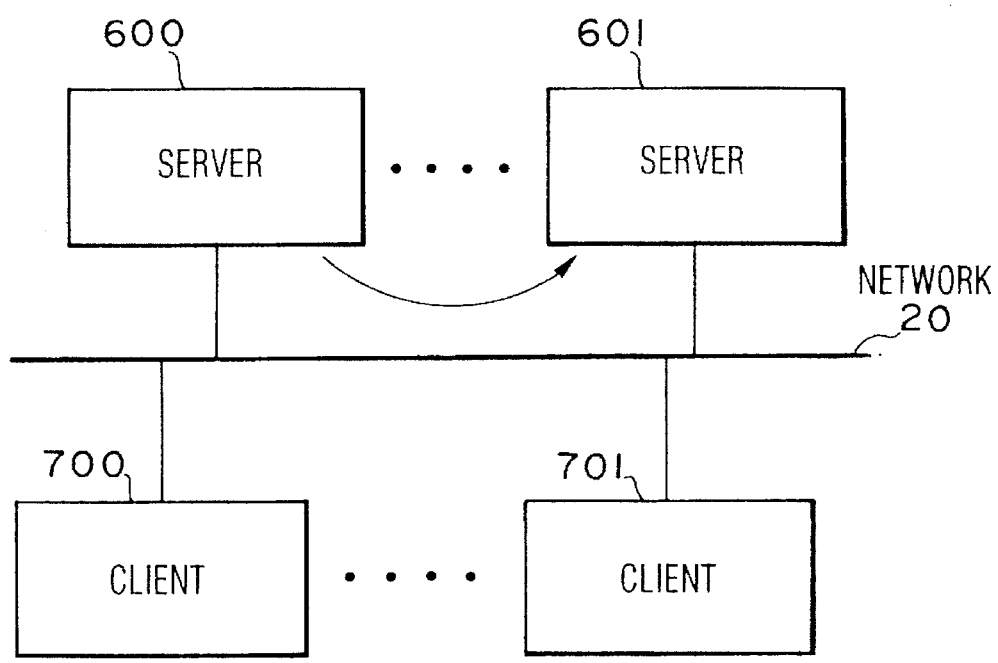
FIG. 11 is a diagram showing a network in which a server controls the main power source of another server.
Figure 12:
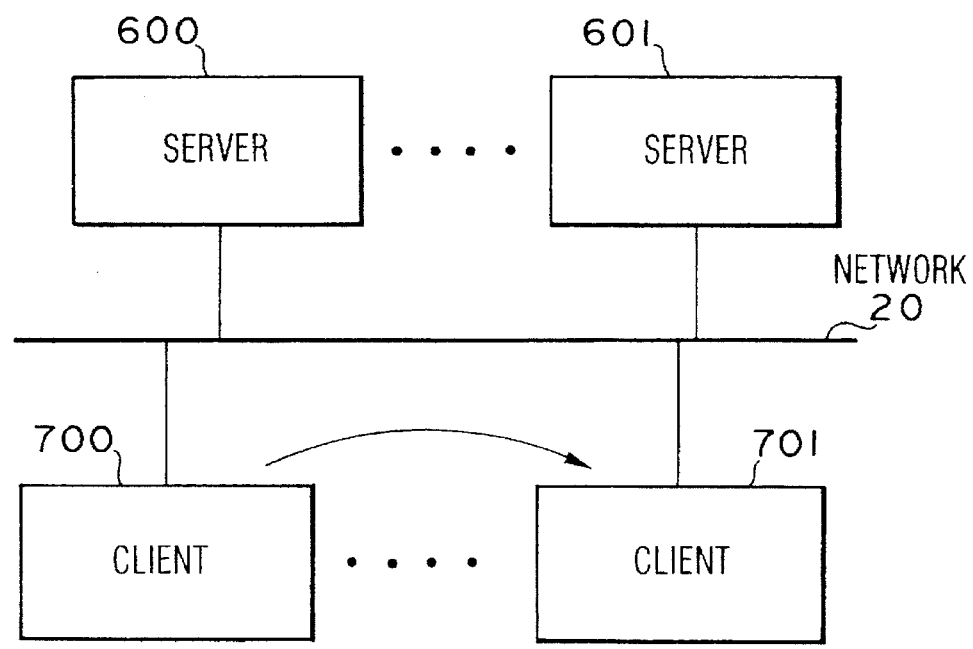
FIG. 12 is a diagram showing a network in which a client controls the main power source of another client.

FIG. 11 is a diagram showing a network in which a server 600 controls the main power source of another server 601, and FIG. 12 is a diagram showing a network in which a client 700 controls the main power source of another client 701. In both the cases, power is turned on or off in accordance with the power control sequence shown in FIG. 5 or 6.

Figure 13:
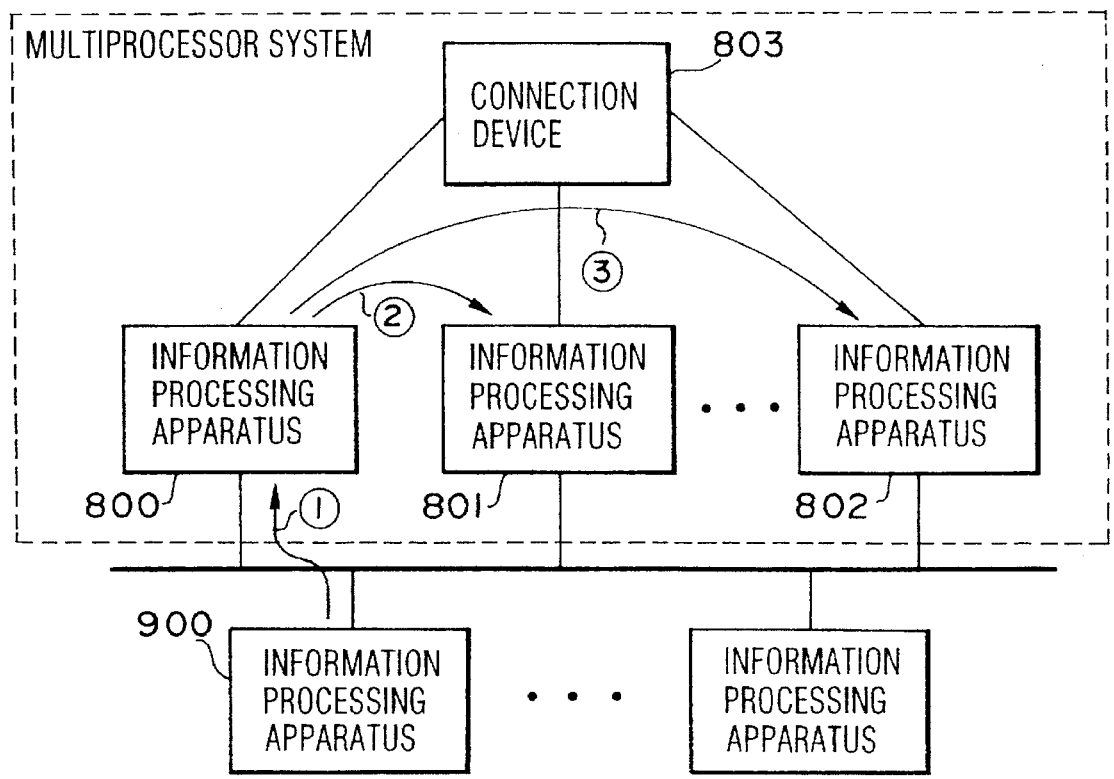
FIG. 13 is a diagram showing a cluster system configuration in which a particular information processing apparatus can control the main power sources of all other information processing apparatuses.

FIG. 13 is a diagram showing a cluster system configuration in which a particular information processing apparatus controls the main power sources of all other information processing apparatuses. A cluster system is a multiprocessor system having a plurality of information processing apparatuses connected to a network. The multiprocessor system shown in FIG. 13 is constituted by a plurality of information processing apparatuses 800, 801, ..., 802 loosely connected together by a connection device 803.

As shown in FIG. 13, after the power source of the first information processing apparatus 800 has been controlled by a power source controlling apparatus (information processing apparatus) 900, the first information processing apparatus 800 becomes a power source controlling apparatus. This power source controlling apparatus refers to the power source turn-on order table shown in FIG. 4 to first instruct the second information processing apparatus 801 to turn on its main power source and to thereafter instruct the third and other information processing apparatuses up to and including the last information providing apparatus 802 to turn on their main power sources. Power is turned on in accordance with the power control sequence shown in FIG. 5 or 6.

Figure 14:
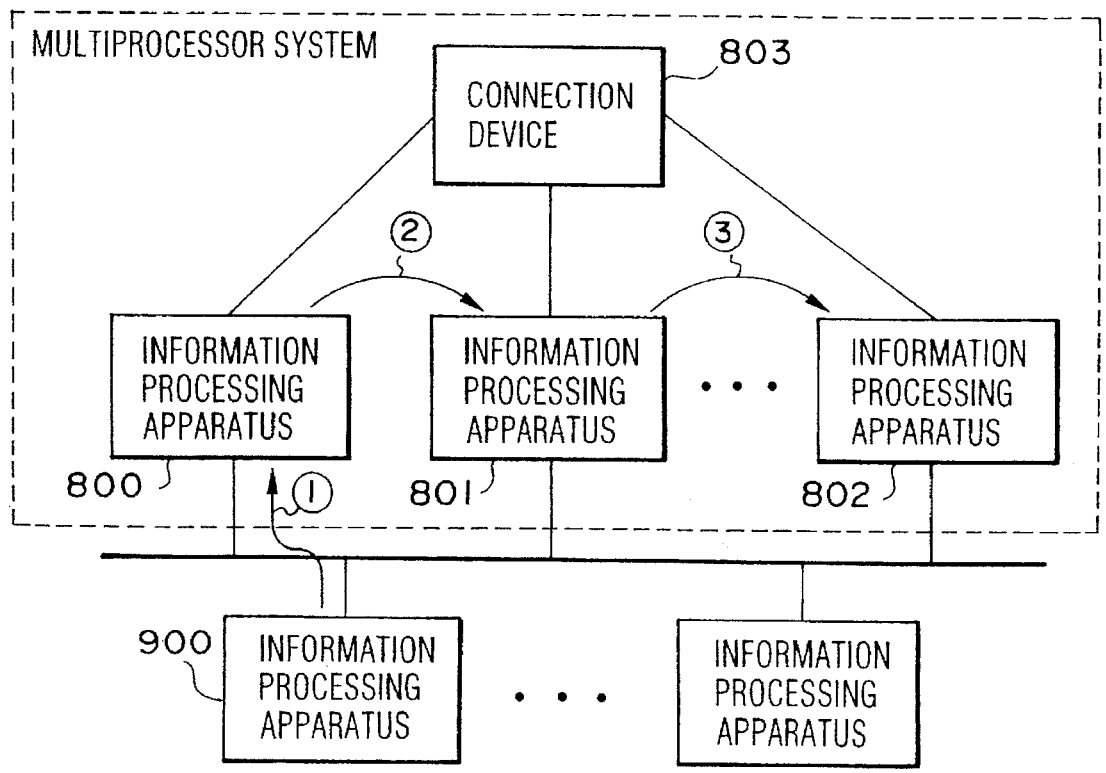
FIG. 14 is a diagram showing a cluster system configuration in which an information processing apparatus whose main power source has been controlled, sequentially relays the power control to other information processing apparatuses.

FIG. 14 is a diagram showing a cluster system configuration in which an information processing apparatus whose main power source has been controlled sequentially relays the power control to other information processing apparatuses. Specifically, the main power source of a first information processing apparatus 800 is first controlled by a power source controlling apparatus (information processing apparatus) 900. The first information processing apparatus 800 controls the main power source of a second information processing apparatus 801, and the second information processing apparatus 801 controls the main power source of the next information processing apparatus. In this manner, the main power sources of all of the information processing apparatuses up to and including the last information processing apparatus 802 are controlled. For this multi-stage sequential power control, the power control sequence shown in FIG. 7 is used.

FIG. 15 is a diagram showing a cluster system in which the main power sources of information processing apparatuses belonging to a same group are controlled collectively by using an IP multicast address. The main power sources of information processing apparatuses 800, 801, . . . , 802 belonging to a same group are controlled by using an IP multicast address in accordance with the power control sequence shown in FIG. 6.

In the cluster systems shown in FIGS. 13 to 15, they can be handled as if each is a single system.

The present invention is not limited to the above embodiments, but various modifications are possible. For example, instead of providing the remote power source controller operated by an auxiliary power source in each information processing apparatus, it may be provided in another device such as a router. A timer may be connected to the processor bus of the remote power source controller to enable power control to be performed both by the timer and by the remote power source controller. With this arrangement, even if control data cannot be received from the network, the power can be controlled by using the timer. The power control only by the timer may be used. The invention is not limited only to the networks described above, but other various networks may be used for the power control, such as networks operating as open systems via a route of LAN-WAN (wide area network) LAN, a route of WAN-LAN, or other routes.

What is claimed is:

1. A remote power source control apparatus for a system, the system including a network and a plurality of information processing apparatuses connected to the network, the remote power source control apparatus comprising:

a plurality of main power sources disposed in respective ones of the information processing apparatuses;

a plurality of auxiliary power sources disposed in respective ones of the information processing apparatuses; and a plurality of remote power source controllers disposed in respective ones of the information processing apparatuses;

wherein in each of the information processing apparatuses, the auxiliary power source is always turned on and always supplies power to only the remote power source controller such that all elements of the remote power source controller are always turned on, and never supplies power to any other element of the information processing apparatus;

wherein in each of the information processing apparatuses, the main power source supplies power to all elements of the information processing apparatus except the auxiliary power source and the remote power source controller when the main power source is turned on; and wherein in each of the information processing apparatuses, the remote power source controller includes:

communication means for transmitting data to and receiving data from the network; and main power source control means for selectively turning on and turning off the main power source in response to data received from the network.

2. A remote power source control apparatus according to claim 1, wherein in each of the information processing apparatuses, the main power source control means further includes data checking means for checking whether the data received from the network was transmitted to the network by an authorized user.

3. A remote power source control apparatus according to claim 2, wherein the network includes at least one of a local area network (LAN) and a wide area network (WAN);

wherein in each of the information processing apparatuses, the communication means includes at least one of a LAN control interface and a WAN control interface; and wherein in each of the information processing apparatuses, the remote power source controller further includes access determining means, responsive to an output of the data checking means, for determining whether the data received from the network was transmitted to the network by a user authorized to control the main power source of the information processing apparatus.

4. A remote power source control apparatus according to claim 1, wherein the information processing apparatuses include:

an information processing apparatus operating as a power source controlling apparatus; and a plurality of information processing apparatuses operating as power source controlled apparatuses; and wherein the remote power source controller of the power source controlling apparatus further includes means for storing a control program predefining at least one of a turn-on order and a turn-off order of the main power sources of power source controlled apparatuses.

5. A remote power source control apparatus according to claim 1, wherein the information processing apparatuses include:

an information processing apparatus operating as a server; and an information processing apparatus operating as a client; and wherein the server controls the main power source of the client via the remote power source controller of the client.

6. A remote power source control apparatus according to claim 1, wherein the information processing apparatuses include:

an information processing apparatus operating as a server; and an information processing apparatus operating as a client; and wherein the client controls the main power source of the server via the remote power source controller of the server.

7. A remote power source control apparatus according to claim 1, wherein the information processing apparatuses include:

an information processing apparatus operating as a first server; and an information processing apparatus operating as a second server; and wherein the first server controls the main power source of the second server via the remote power source controller of the second server.

8. A remote power source control apparatus according to claim 1, wherein the information processing apparatuses include:

an information processing apparatus operating as a first client; and an information processing apparatus operating as a second client; and wherein the first client controls the main power source of the second client via the remote power source controller of the second client.

9. A remote power source control apparatus according to claim 1, wherein the information processing apparatuses include:

an information processing apparatus operating as a power source controlling apparatus; and a plurality of information processing apparatuses operating as a multiprocessor system;

wherein the power source controlling apparatus controls the main power source of one of the information processing apparatuses of the multiprocessor system via the remote power source controller of the one information processing apparatus of the multiprocessor system; and wherein the one information processing apparatus of the multiprocessor system controls the main power sources of other ones of the information processing apparatuses of the multiprocessor system via the remote power source controllers of the other information processing apparatuses of the multiprocessor system.

10. A remote power source control apparatus according to claim 9, wherein the one information processing apparatus of the multiprocessor system sequentially controls the main power sources of the other information processing apparatuses of the multiprocessor system via the remote power source controllers of the other information processing apparatuses such that the main power sources of the other information processing apparatuses of the multiprocessor system are at least one of sequentially turned on one at a time and sequentially turned off one at a time.

11. A remote power source control method for a system, the system including a network and a plurality of information processing apparatuses connected to the network, the remote power source control method comprising the steps of:

providing each of the information processing apparatuses with a respective main power source, a respective auxiliary power source, and a respective remote power source controller, wherein in each of the information processing apparatuses, the auxiliary power source is always turned on and always supplies power to only the remote power source controller such that all elements of the remote power source controller are always turned on, and never supplies power to any other element of the information processing apparatus, wherein in each of the information processing apparatuses, the main power source supplies power to all elements of the information processing apparatus except the auxiliary power source and the remote power source controller when the main power source is turned on, and wherein in each of the information processing apparatuses, the remote power source controller includes a processor, a memory, and a main power source driver;

storing, in each of the information processing apparatuses, security information in the memory, the security information being for use in checking whether data received from the network was transmitted to the network by an authorized user;

receiving, in each of the information processing apparatuses, using the processor, data from the network;

checking, in each of the information processing apparatuses, using the processor, whether the data received from the network is power source control data which was transmitted to the network by an authorized user based on the security information stored in the memory; and controlling, in each of the information processing apparatuses, using the processor, the main power source driver to selectively turn on and turn off the main power source in response to the power source control data if it is determined in the checking step that the data received from the network is power source control data which was transmitted to the network by an authorized user.

12. A remote control power source method according to claim 11, further comprising the step of transmitting power source control data to the network from one of the information processing apparatuses;

wherein the power source control data transmitted to the network from the one information processing apparatus is power source control data for controlling the main power source driver of at least one other one of the information processing apparatuses.

13. A remote control power source method according to claim 12, wherein the power source control data transmitted to the network from the one information processing apparatus is power source control data for controlling the main power source driver of a plurality of other ones of the information processing apparatuses, and is transmitted to the network in a multicast manner.

* * * * *